United States Patent
Herb et al.

(10) Patent No.: US 6,726,117 B2
(45) Date of Patent: Apr. 27, 2004

(54) RAIL FASTENER

(75) Inventors: Armin Herb, Apfeldorf (DE); Armin Hoffmann, Lansberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/014,132

(22) Filed: Oct. 8, 2001

(65) Prior Publication Data

US 2002/0121558 A1 Sep. 5, 2002

(51) Int. Cl.[7] .............................................. E01B 13/00
(52) U.S. Cl. ...................................................... 238/315
(58) Field of Search ................................ 238/310, 315, 238/316, 338, 342, 343, 349

(56) References Cited

U.S. PATENT DOCUMENTS

| | | | |
|---|---|---|---|
| 4,494,695 A | * 1/1985 | Sonneville | 238/265 |
| 4,635,846 A | * 1/1987 | Todd | 238/152 |
| 4,830,531 A | 5/1989 | Condit et al. | |
| 4,967,954 A | * 11/1990 | von Lange | 238/282 |
| 6,325,301 B1 | * 12/2001 | Vanhonacker | 238/283 |
| 2001/0004099 A1 | * 6/2001 | Onishi | 248/49 |

FOREIGN PATENT DOCUMENTS

| | | |
|---|---|---|
| EP | 0928902 | 7/1999 |
| NL | 1005552 | 9/1998 |

* cited by examiner

*Primary Examiner*—Stephen Avila
*Assistant Examiner*—Robert J. McCarry, Jr.
(74) *Attorney, Agent, or Firm*—Sidley Austin Brown & Wood, LLP

(57) ABSTRACT

A fastener having a grip member (1) that is insertable into a mounting space (3) of a hollow structure (2) and serves in the detachable fastening of an object to the hollow structure. The grip member (1) is rotatable inside the hollow structure such that the grip member (1) grips behind holding projections provided inwardly of the hollow body longitudinal walls. The holding projections are for fastening of the object between a stop (7), that outwardly abuts the edges of the hollow structure's longitudinal walls (4) lining the mounting space and can be fixedly clamped to the grip member (1). A spring biased element (13) acting perpendicular to the stop (7) is arranged between the grip member and the stop. The result is that pre-fixation of the fastener to the hollow structure is made possible. By means of a coupling (15) between the stop (7) and the rear grip member (1) its positions are precisely fixed.

7 Claims, 5 Drawing Sheets

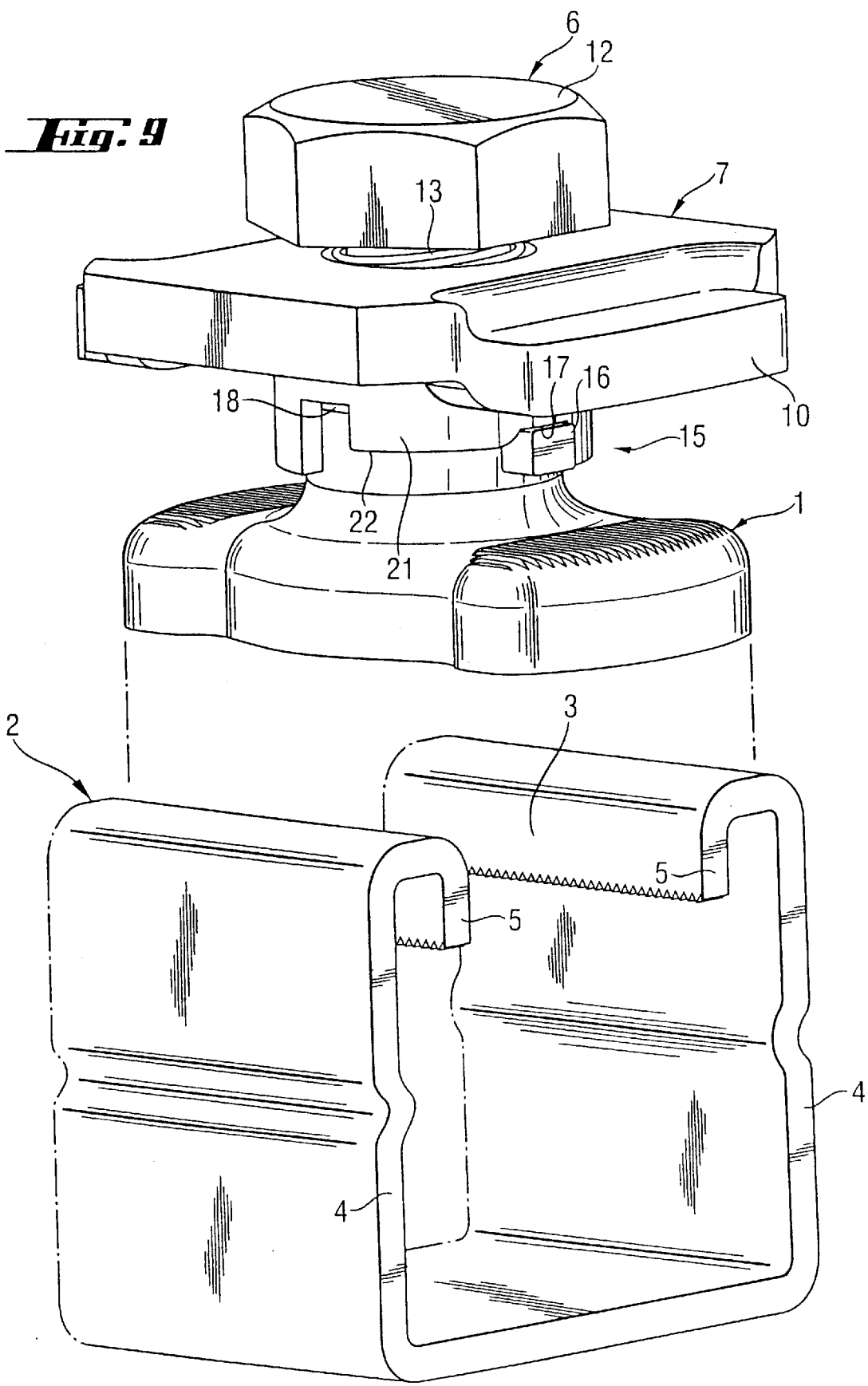

RAIL FASTENER

BACKGROUND OF THE INVENTION

The invention relates to a fastener with a shoulder that is insertable into a mounting space in a hollow structure and is rotational within the hollow structure such that a grip member grips mounting extensions on opposite sides of the hollow structure from behind and from within and having at least one stop member that makes contact with the front external edges of longitudinal walls of the hollow structure abutting the mounting space and is connected with the grip member and further is elastically mounted relative to the grip member by a spring biased element acting perpendicular to the stop member.

Fasteners of this type are used in the fastening of objects, for example, to a C-shaped mounting rail. To this end, the mounting rail can be fastened to a base structure. The fastener is introduced into the mounting space and, for example, rotated 90°. The fastener thus grips the holding projections of the mounting rails. In an initial fixed position it is possible to displace the fastener along the length of the mounting rail for the purpose of making adjustments. To effect a final fixed position of the fastener to the mounting rail, the grip member is biased relative to the stop by using a threaded pin or bolt, and it thus securely clamps to the mounting projections. This type of fastener is suited for fastening elongated objects such as tubes or the like.

A fastener of this type, for example, is disclosed in DE 197 36 933 A1. This well-known fastener having a bolt is characterized by a grip member that is rotational such that the grip member grips the mounting projections arranged on the mounting rails. The mounting projections of the mounting rails are fixable, using a nut element, between the grip member and a moveably mounted stop member situated axial to the bolt. To facilitate an initial fixed position a pre-stressed spring element is arranged between the nut and the stop. The spring has the effect that the grip member is drawn up against the stop by the spring force and the mounting projections are lightly clamped between the grip member and the stop. In particular, the well-known fastener is initially fixed to the mounting rail. By moving the fastener along the mounting rail, its position can be adjusted. The position of the fastener relative to the mounting rail is secured by tightening the nut element on the bolt. In this situation, the nut assumes the function of the spring element and fixes the mounting projections of the mounting rail between the stop and the grip member.

The advantage of this known solution is that the adjustment can be made in the case of the initially fixed fastener. By application of a force opposing the resilient force of the spring on the bolt, the initial fixed position is loosened and the fastener can be adjusted along the length of the mounting rail. If the force acting upon the bolt is removed, the fastener is again in the pre-set or initial position in the mounting rail.

The disadvantage of the known solution resides in the fact that the 'hammer head', following introduction into the mounting space of the mounting rail, must be rotated by an angle certain, for example 90°, using the bolt, in order to optimally grip the mounting projections from behind. Particularly in difficult to reach places, this circumstance becomes a disadvantage, because a user has no opportunity of inspection for the purpose of determining whether the 'hammer head' is rotated to the pre-determined angle relative to the holding projections. In the case of fasteners that are under dynamic loading, this situation alone can result in failure of the fastener between the mounting rail and the known fastener.

SUMMARY OF THE INVENTION

The object of the present invention is to provide a fastener with a rotational grip member that allows a pre-fixed position that assures proper positioning of the grip member relative to the holding projections. Further, the fastener is manageable and allows for simple assembly.

According to the invention, the object is achieved in that the stop is characterized by a coupling part and the grip member is characterized by a counter-coupling part, such parts being connectable with each other to form a detachable, rotationally resistant connection.

In that the stop and the grip member are coupled to one another, the possible positions of the grip member relative to the mounting projections are pre-determined; in particular, the angle between the stop and the grip member is set. That means that for a user, the position of the grip member in the coupled condition is unequivocal. It is critical that the stop is essentially rotationally-locked relative to the mounting rail, especially relative to the holding projections, so that a definite positioning of the grip member can be assured. For example, an object to be fixed, in particular a bracket element, serves as the stop.

Preferably the coupling is characterized by pawls and grooves that act together in a form-locking fashion and can be positioned, by relative movement perpendicular to the stop, between a release position and at least one engagement position, whereby the coupling in the passive state is held in an engagement position by means of the spring element. The result is that, in the release position, it is possible for the user to place the coupling between various coupling positions, in particular to set different angles between the grip member and the mounting space. In a preferred embodiment the coupling is of a cylindrical design, wherein the axis of the coupling runs approximately centrally to the width of the mounting space and perpendicular to the stop. In this case, the width is defined as the extension transverse to the length of the mounting rail opening.

The coupling advantageously exhibits at least two engagement positions, an entry or introduction position and a locked position, whereby the distance (a) between the stop and the grip member in the entry position corresponds at least to the extension (b) of the holding projections perpendicular to the stop and in the locked position greater than the extension (b). It is thus possible, in the entry position of the coupling, for the user to pass the fastener through the mounting space of the mounting rail and by placement of the coupling in the release position and by rotating to set the grip member in the gripping position. Once the predetermined position of the grip member relative to the holding projections is reached, the locked position can again be connected. In a preferred embodiment the coupling exhibits two engagement positions, an entry position and a locked position. In this way, handling is especially simplified for the user. The locked position is defined in such a manner relative to the mounting rail opening, in particular relative to the holding projections, that fixing of the grip member is optimal, particularly the gripped surface is maximized. Preferably the coupling is characterized by two diametrically arranged pawls that engage form-lockingly in the locked position into two complementarily formed locking grooves and in the entry position into two entry grooves whereby the entry grooves receive the pawls only partially. The fact that the entry grooves receive the pawls only partially allows positioning of the coupling from the entry position into the release position with only a minimum application of force. In particular, the spring biasing element and the entry grooves are so constructed that the pawls can be repositioned from the entry position into the release position by mere rotation. From such position a torque moment is sufficient to position the coupling in the entry position into which it snaps on its own by virtue of the spring force. A particularly advantageous embodiment exhibits webs between the locking grooves and the entry grooves with a pitch that is so dimensioned that the pawls slide out of the release position into the entry position. A pitch of, for example, 30° has been shown to be particularly advantageous. Of course, the pitch can be designed greater, since the sliding behavior is dependent upon different base conditions such as spring force and/or material.

Preferably, the grip member is connected to the stop by a bolt, whereby the grip element is connected frictionally or in a force-locking manner and the stop is rotationally connected with the bolt. The bolt has at the end facing away from the grip member a torque transmission means, which projects at least partially radially over the grip member. It is thus possible for the user, by using the bolt, to bring both the torque to a positioning between the various entry positions and the force perpendicular to the stop for positioning between the release position and the entry position. In addition, the frictional or force-locking connection between the bolt and the grip member assures simple and manageable mounting of the fastener. At the start of the fastening operation the coupling is situated in the entry position. In such position the fastener is guided by the user into the mounting rail opening up to the stop that frontally outward abuts the edges of the hollow structure longitudinal walls lining the mounting space. By the application of torque to the torque transmission means the pawls are drawn out of the entry grooves. In a particular embodiment the entry grooves are further characterized by a V-shaped design. The webs present between the entry grooves and the locking grooves guide the pawls axially to the bolt. The pawls snap in a form-locking manner into the locking grooves and the rotational movement of the grip member is blocked. The fastener is pre-fixed in the locking position with the mounting rail. This means that the grip member optimally grips the holding edges. The frictional or force-locking connection between bolt and grip member is embodied in such a fashion that it releases and the bolt is screwed by the torque moment into the grip member. Since the torque transmission means overlaps the bolt at least partially radially and is particularly embodied as a screw head, the result is a secure clamping to the mounting rail, in particular to the holding projections, between the stop and the grip member, because the stop is compressed by the torque transmission means axially to the bolt against the grip member.

The spring biasing element is advantageously embodied as an annular conical washer that is arranged on the side of the stop facing outwardly from the rear grip member, in order to configure the spring element in a space saving and economical way.

In another preferred embodiment, the spring biasing element is designed as a cylindrical coil spring arranged on the side of the stop facing outwardly from the grip member, in order to assure economical manufacture.

Preferably, the spring biasing element is formed as a plastic part that is arranged on the side of the stop facing outwardly from the grip member, to allow the least possible expansion of the fastener outside of the hollow structure.

The distance axial to the bolt between the rear grip member and the stop advantageously corresponds at a maximum to the height of the holding projections axial to the bolt. Thus, it is assured that the holding projections between the grip member and the stop can be firmly clamped.

The stop and the grip member advantageously each exhibit a sleeve-like guide member, it being possible to bring such members into engagement, in order to assure guidance of the rear grip member relative to the stop. Preferably the two guide parts can be slid into each other, having a common middle axis, and are constructed rotationally relative to each other. In the case of this further embodiment the two guide parts are arranged advantageously in the region of the coupling, in order to assure proper function of same.

BRIEF DESCRIPTION OF THE DRAWING

The invention is more fully explained using an exemplary embodiment read together with the drawings, wherein:

FIG. 9 depicts a perspective view of a further embodiment without a mounting rail.

DETAILED DESCRIPTION OF THE INVENTION

Figure 1:
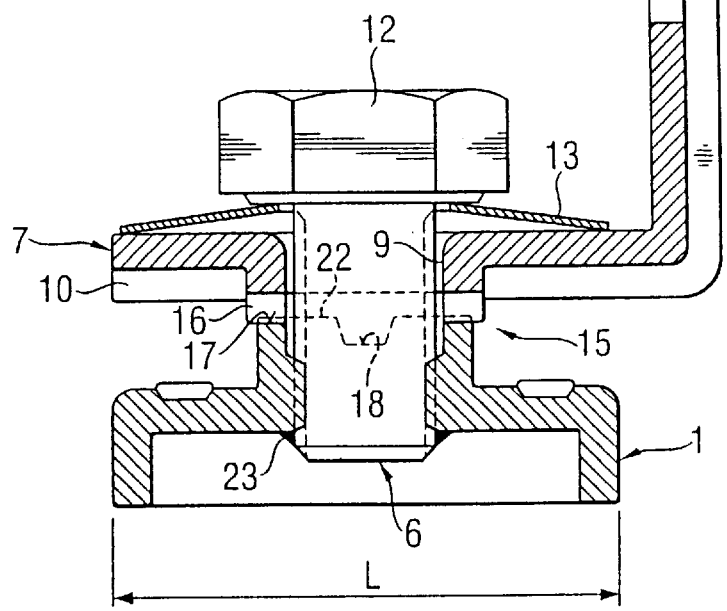
FIG. 1 shows an initial embodiment in cross-section without a mounting rail.
Figure 2:
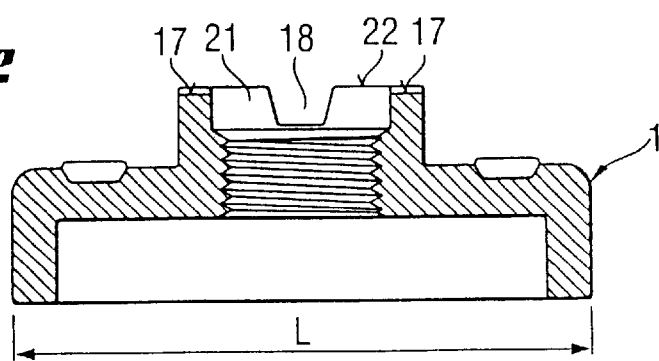
FIG. 2 is an enlarged sectional view of the grip member of FIG. 1.
Figure 3:
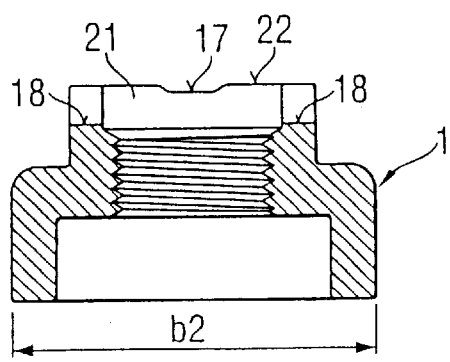
FIG. 3 is a sectional view of the grip member of FIG. 2 rotated through 90°.

In FIGS. 1 to 8 a fastener according to the invention is shown with a grip member 1, that is introducible into a mounting space 3 in a hollow structure 2. The hollow structure 2, in particular a C-shaped mounting rail, is characterized by holding projections 5 extending inwardly and longitudinally on opposite walls 4 of the hollow structure 2; the projections are gripped by the grip member 1.

The grip member 1 is connected by a bolt 6 having an external thread with a stop 7 abutting the upper edges of the longitudinal walls of the hollow structure adjacent to the mounting opening 3. The embodiment of the grip member 1 is essentially pot-shaped, whereby the length L of the grip member 1 corresponds approximately to the distance b1 between the opposing inner surfaces of the longitudinal walls of the hollow structure 2. In order to afford optimal guidance of the grip member 1 in the mounting space 3 during the insertion process, the width b2 of the rear grip member 1 corresponds approximately to the distance b3 of the two laterally spaced holding projections 5.

The stop 7 is formed in this embodiment by a bracket member. The stop is characterized by a through-passage bore 9 for guiding the bolt 6. The external diameter of the bolt 6 corresponds approximately to the diameter of the bore. The stop 7 is mounted axially displaceably to the bolt 6. The stop 7 is characterized by bends 10 that are insertable against complementarily formed curvatures 11 at the upper ends of the longitudinal walls of the hollow structure 2 for the purpose of rotational locking relative to the hollow structure 2.

The bolt 6 has a torque transmission means 12, in particular a screw head, at the upper end facing away from the grip member 1. A spring biasing element 13, in particular a curved washer, is arranged between the torque transmission means 12 and the stop 7.

The stop 7 and the grip member 1 are connected to each other by a coupling 15. The stop 7 is characterized by two diametrically arranged pawls 16 that are insertable into grooves 17, 18 arranged on the grip member 1. The spring biasing element 13 stresses the grip member 1 and the stop 7 against each other. The grip member 1 is characterized by two each diametrically arranged groove pairs 17 and two locking grooves 18. The locking grooves 18 arranged diametrically to one another are constructed complementary to the pawls 16 and receive the later wholly. In contrast, the entry grooves are characterized by a slight extension axial to the bolt 6, so that the pawls can be rotated out of the entry grooves 17 by means of the torque; they do not, however, uncouple unintentionally, for example, at the time of transport or the like. The entry grooves 17 are each arranged offset by an angle of 90° relative to the locking grooves 18. Consequently, the grip member 1 can be inserted into the entry position, as shown in particular in FIG. 3, within the mounting space 3.

FIGS. 4 to 7 illustrate the mounting bracket in the mounting operation.

Figure 4:
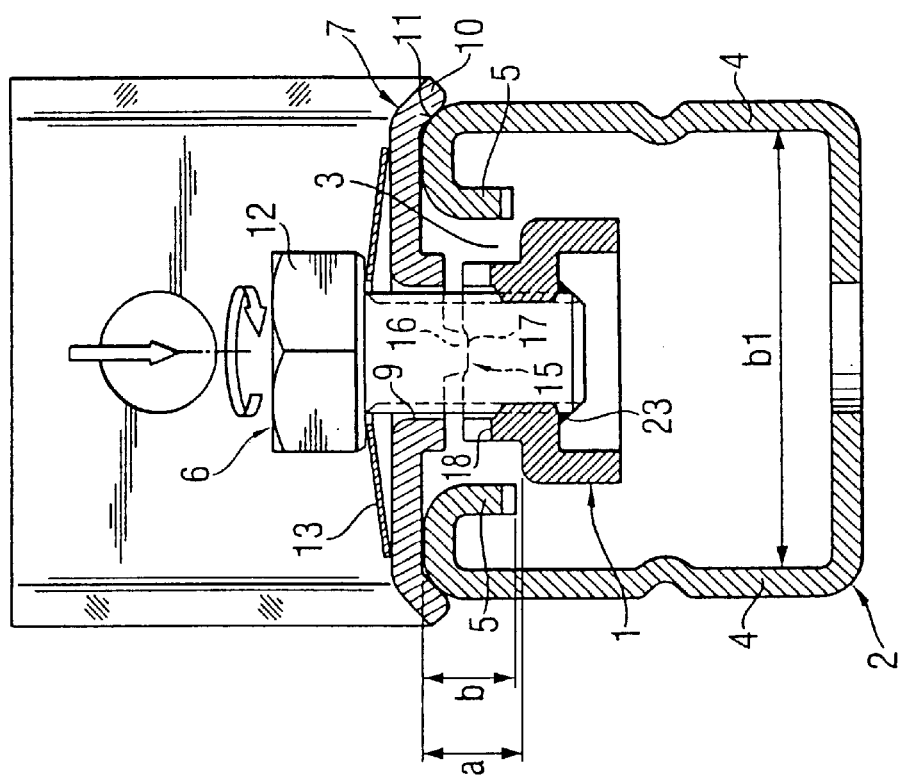
FIGS. 4 to 7 illustrate a mounting operation using the fastener illustrated in FIG. 1.

In FIG. 4 the fastener is introduced through the mounting space 3 of the hollow structure 2 into the inside space of the hollow structure 2. The coupling 15 acting between the rear grip member 1 and the stop 7 can be positioned between an entry position E, as shown in FIG. 4, and a locking position S, as is shown in particular in FIGS. 6 and 7. In the entry position E the pawls or grips 16 are in engagement with two diametrically arranged entry grooves 17.

Figure 5:
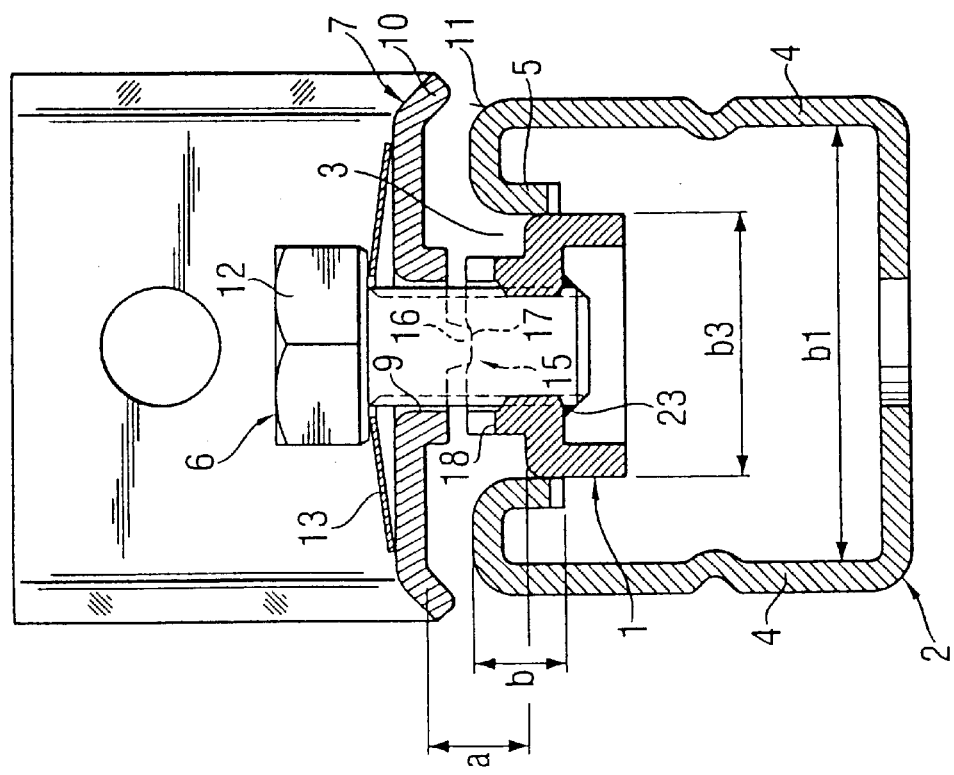
Figure 7S:
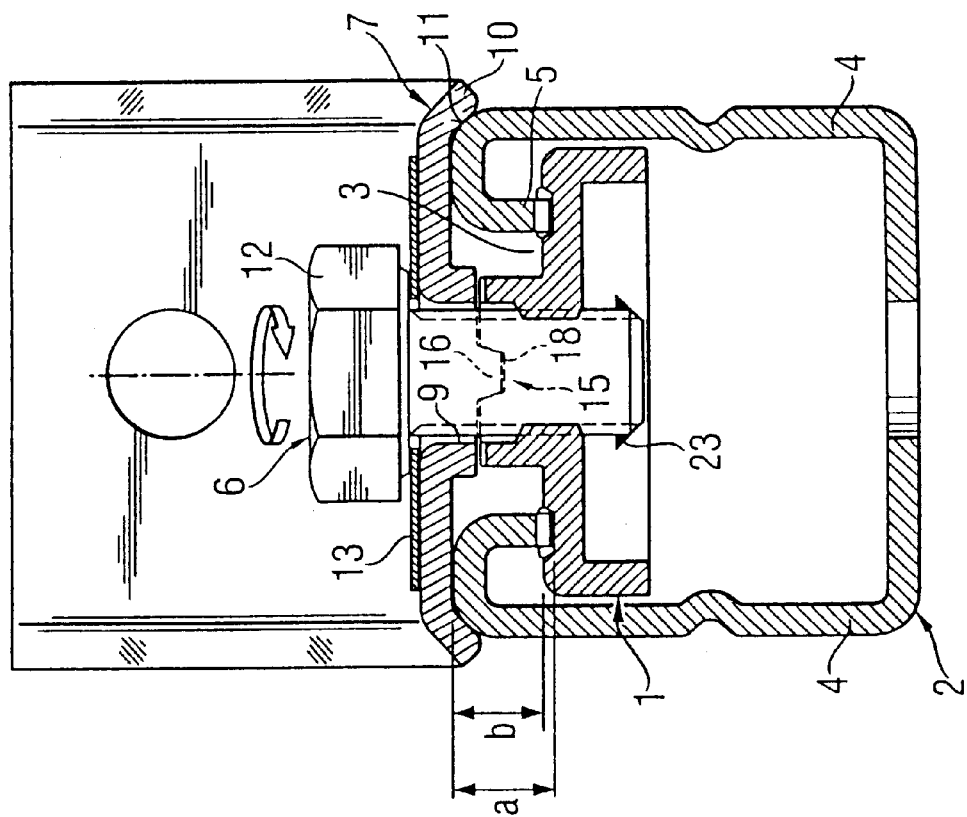
Figure 6S:
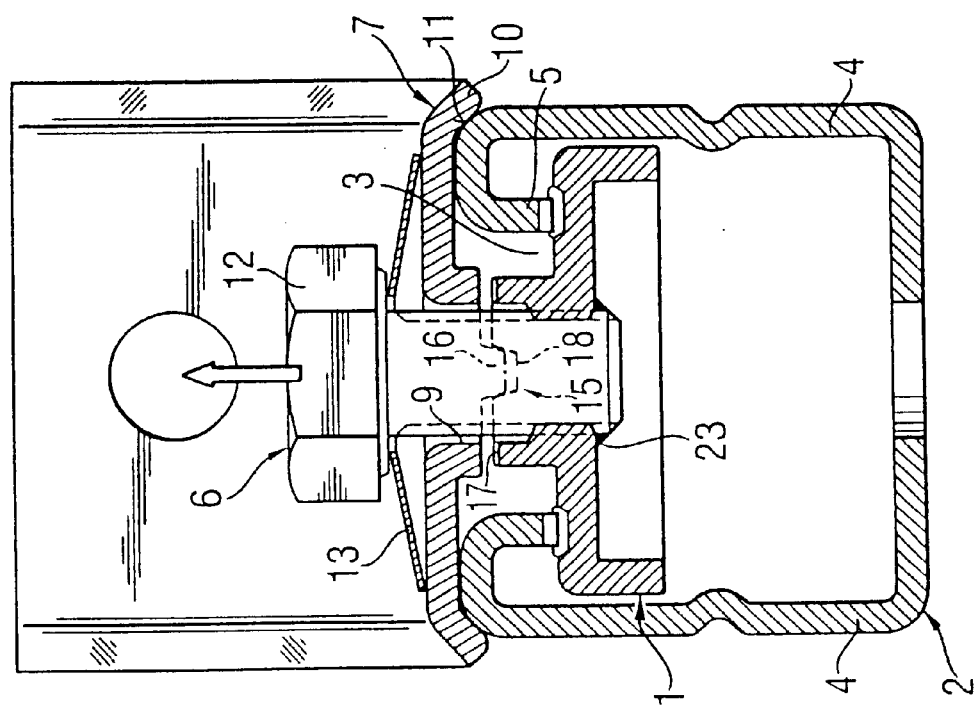

By application of a force F axially of the bolt, the coupling 15 is positioned out of an engagement position E, as is illustrated in particular in FIGS. 4, 6 and 7, into a release position, which is illustrated in particular in FIG. 5. The result is elimination of the interlock between the pawls or grips 16 and the entry grooves 17. By rotating the bolt 6 relative to the hollow structure 2 into the release position of the pawls 16, the grip member 1 can be brought into a position, in which it grips the holding projections 5 of the hollow structure 2. Between the groove pairs 17, 18, webs are arranged that serve in the guidance of the grip member 1 into the release position of the coupling 16. The result is that no further force F is required axial to the bolt 6 in the release position of the coupling 15 external to the axial projection of the groove pairs 17, 18, because the pawls 16 are guided by the webs 21 by means of a contact surface 22. The spring biasing element 13 urges the pawls or grips 16 into the release position against the contact surface 22.

If the pawls 16 lie in the axial projection region of the locking grooves 18, then the coupling 16 snaps in a form-locking manner, as shown in particular in FIGS. 6 and 7. The coupling 15 is now in the locking position. Further rotation of the bolt 6 results in overcoming force-locking connection 3 between the bolt 6 and the grip member 1 and the stop 7 is actuated against the grip member 1. This results in the tensioning of the holding projections 5 between the stop 7 and the grip member 1, as can be seen in particular in FIG. 7. As can be seen in FIG. 6, the pawls 16 are not yet completely received in the locking grooves 18. Only on further rotation will the gap be bridged and guided into the end position, as illustrated in FIG. 7.

Figure 8:
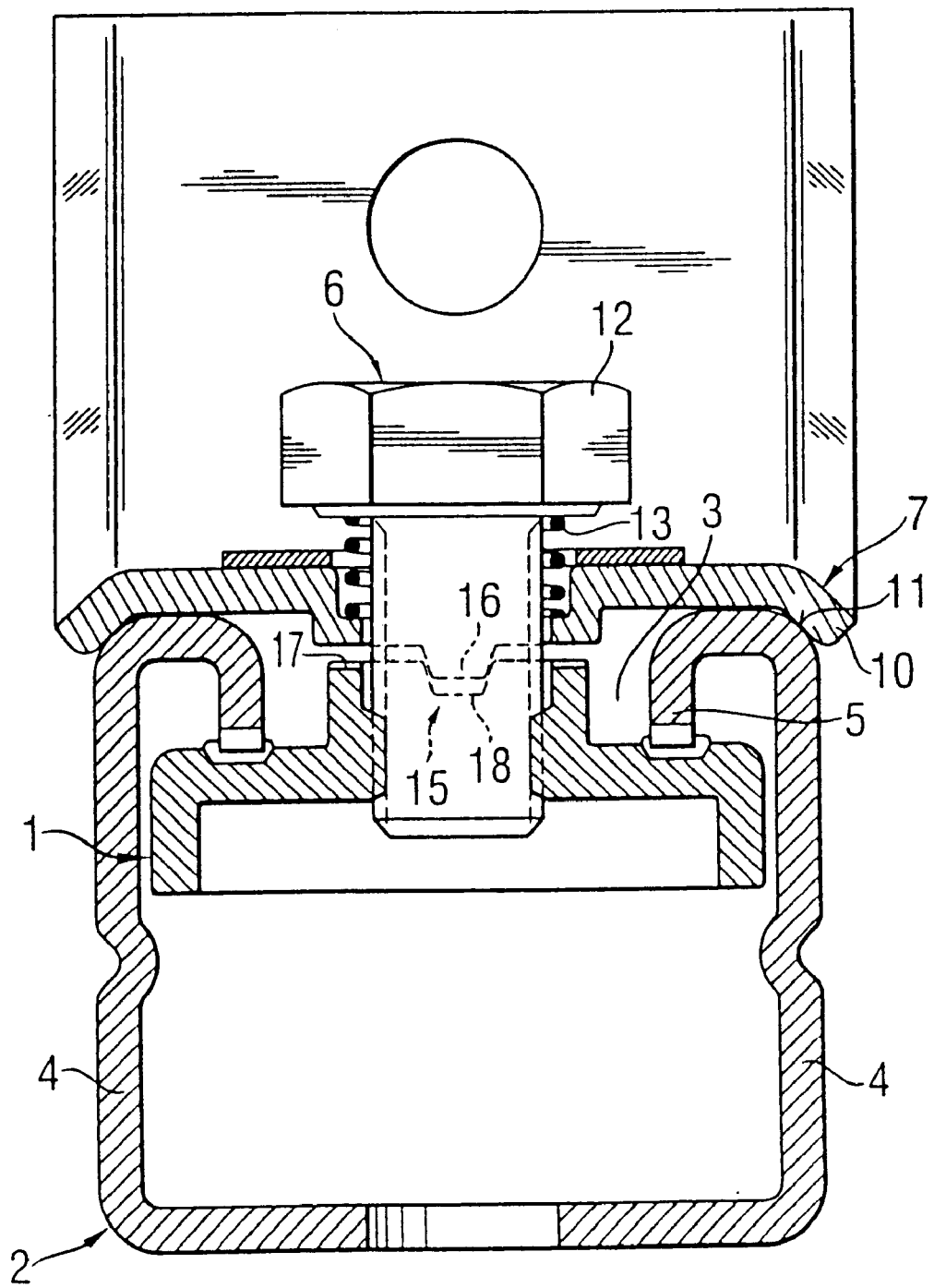
FIG. 8 shows a sectional view of the fastener illustrated in FIG. 1 with a coil spring.

In FIG. 8 the fastener is executed with a cylindrical coil spring as the spring biased element 13. A conical coil spring can also be used in lieu of a cylindrical coil spring.

In FIG. 9 a further embodiment of a fastener according to the invention is illustrated; the fastener having a grip member 51 and a stop 52, that can be threadedly urged upon each other by means of a screw 56, together with the hollow structure 2 already shown in FIGS. 1 to 8. Analogous to the embodiment illustrated in FIG. 1, the grip member 51 is connected with the stop 52 by a coupling 53. In contrast with the embodiment illustrated in FIG. 1, the grip member 51 and the stop 52, in the region of the coupling 53, are characterized by a sleeve-like extension 54, 55, respectively, that are in engagement. The two sleeve-like extensions 54, 55 are arranged coaxial to each other and serve to guide the grip member 51 relative to the stop 52 with reference to their common middle axis. The external diameter of the first sleeve-like extension 54 of the grip member 51 corresponds approximately to the inside diameter of the second sleeve-like extension 55 of the stop 52, in order to afford the most precise guidance possible.

What is claimed is:

1. A fastener comprises a grip member (1) and a stop (7) connectable to one another and forming a detachable, rotationally resistant connection, said grip member (1) is insertable through a mounting space (3) in a hollow structure (2) with the mounting space (3) extending in the direction of said hollow structure (2) and being rotatable within said hollow structure (2), said mounting space (3) formed by a pair of parallel laterally spaced apart holding projections (5) extending inwardly into said hollow structure (2) and spaced laterally inwardly from a pair of opposite exterior walls (4) of said hollow structure (2) with said exterior walls (4) extending in parallel relation with said holding projections (5) engageable with said grip member (1), said stop (7) cooperable with said grip member (1) and located outwardly of said mounting space (3) with said hollow structure (2) and engageable in contact with edges of said exterior walls (4) spaced laterally outwardly from said mounting space (3), said stop (7) covering and closing off said mounting space (3), means (6) connecting said stop (7) with said grip member (1), a detachable rotationally lockable coupling (15) formed by a coupling part (16) on said stop (7) interengageable with a counter-coupling part (17, 18) on said grip member (1), said grip member (1) having a first dimension (b3) approximately equal to the spacing between said holding projections (5) so that said grip member (1) can be inserted into said hollow structure (2) through said mounting space (3) and a second dimension (b1) perpendicular to and greater than said first dimension (b3) and approximately equal to the spacing between inside surfaces of said exterior walls (4) so that said grip member (1) can be rotated within said hollow structure inwardly of said mounting space extending perpendicularly to and between said inside surfaces of said exterior walls (4), said coupling part on said stop (7) comprises pawls (16) and said counter-coupling part comprises grooves (17, 18) on said grip member (1) that cooperate interlockingly in an engagement position (E) and by relative rotational movement and movement perpendicular to said stop (7) can be positioned between a release position and at least one engageable position (E) and in a neutral condition therebetween held in engagement by a spring biasing element (13), bearing on a surface of said stop facing outwardly away from said grip member 6.

2. A fastener, as set forth in claim 1, wherein said coupling (15) has at least two engagement positions, and one entry position (E) and one locking position (S) whereby a distance (a) between said stop (7) and said grip member (1) corresponds in the entry position (E) at least to the length (b) of the holding projections (5) perpendicular to said stop (7) and in the locking position (S) the distance (a) is greater than the length (b) of the holding projections (5).

3. A fastener, as set forth in claim 2, wherein said pawl (16) on said coupling part comprises two diametrically arranged pawls (16) engageable in the locking position (S) to two complementary formed locking grooves (18) on said grip member (1) and in the entry position (E) into two entry grooves (17) having a depth for only partially receiving said pawls (16).

4. A fastener, as set forth in claim 1, wherein said means (6) connecting said grip member (1) to said stop (7) comprises a bolt (6) with said grip member (1) one of frictionally and force-lockingly connected thereto and said stop (7) rotationally connected to said bolt (6), and said bolt (6) having a torque transmission means (12) formed on said bolt (6) at an end thereof outwardly of said stop (7) with said torque transmission means (12) at least partially overlapping said stop (7).

5. A fastener, as set forth in claim 1, wherein said spring biasing element (13) comprises an annular conical washer acting on a side of said stop (7) facing away from said grip member (1).

6. A fastener, as set forth in claim 1, wherein said spring biasing element (13) comprises a cylindrical coil spring acting on a side of said stop (7) facing away from said grip member (1).

7. A fastener, as set forth in claim 1, wherein said spring biasing member (13) comprises a plastic part acting on a side of said stop (7) facing away from said grip member.

* * * * *